UNITED STATES PATENT OFFICE 2,573,662

CARBOXYPYRIDINE SULPHONIC ACID COMPOUNDS

Bernard F. Duesel, Yonkers, and John V. Scudi, New York, N. Y., assignors to Nepera Chemical Co. Inc., Yonkers, N. Y., a corporation of New York No Drawing. Application March 17, 1948,
Serial No. 15,505

6 Claims. (Cl. 260—295)

This invention relates to carboxypyridine-5(or 3)-sulphonic acid compounds as new compositions of matter and to processes of producing the same.

Pyridine sulphonic acids are known to be useful for producing vitamins. Since the uses for pyridine are constantly increasing, the supply of the same for producing such sulphonic acids has gradually decreased and is now quite limited. The carboxypyridine sulphonic acid compounds of the present invention are important intermediates for the production of pyridine sulphonic acid compounds and as well for the production of various other pharmaceutical compounds.

One of the objects of the present invention is to produce intermediates capable of conversion into pyridine sulphonic acid from a readily available and comparatively cheap source, that is, from picolines.

Another object is to produce a new class of pyridine sulphonic acid compounds which find utility in the synthesis of various pharmaceuticals. Still another object is to provide a series of new compounds which may be defined as carboxypyridine-5(or 3)-sulphonic acids and their salts.

In accordance with the present invention, picolines are employed which contain the methyl group in the 2, 3 or 4 position and which have been sulphonated by reacting the same with sulphuric acid or oleum in any suitable manner, as by the process of the Wulff United States Patent Number 1,880,646 or the process of McElvain and Goese, J. A. C. S., volume 65, page 2233, of 1943. In these processes the sulphonic acid or sulphonate group ordinarily joins in the ring at the 5 position. After the formed pyridine sulphonic acid or its alkali metal salt is isolated, it is dissolved in a suitable solvent and the methyl group is thereupon oxidized into the carboxyl group. This oxidation is preferably accomplished by the action of potassium permanganate or manganese dioxide and may be effected in alkaline or acid solution. The reaction is aided by heating to a suitable temperature and the product formed may be isolated by any conventional procedure, a number of methods being described in the examples hereinafter set forth.

The probable basic chemical equations of the process are:

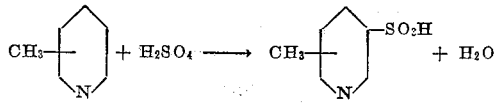

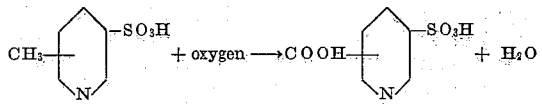

The following examples illustrate preferred methods of carrying out our invention.

Example 1

Eighty-seven and five tenths grams of sodium 2-methylpyridine-5-sulphonate are dissolved in 3 liters of water. The resulting solution is heated to 70° C. and 175 grams of potassium permanganate is added in small portions under constant stirring. The addition takes about one and a half hours. The reaction mixture is kept at 70° C. under stirring for another hour and a half, when the process of oxidizing is completed. The precipitate of manganese dioxide is filtered off and the clear filtrate is concentrated to a volume of one liter, and acidified with hydrochloric acid to a pH of 6.0–6.2. A solution of barium chloride (20%) is now added to it until the precipitation of the barium salt of the carboxypyridine sulfonic acid is complete. The barium salt is collected on a filter and washed with warm water. The pure barium salt is then suspended in 500 cc. of boiling water, and the free acid is liberated by the addition of dilute sulfuric acid until the precipitation of barium is complete. The formed barium sulfate is filtered off and the filtrate is concentrated. The product, 2-carboxypyridine-5-sulphonic acid crystallizes out of the concentrated solution. It forms a white crystalline powder and its melting point is 287° C.

Example 2

Seventeen and three tenths grams of 2-methylpyridine-5-sulphonic acid are dissolved in 40 grams of conc. sulfuric acid and heated to 90° C. A slurry of 35 grams of manganese dioxide in 40 grams of conc. sulfuric acid is added in small portions under constant stirring. The addition of the slurry is carried out over a period of four hours, and during this time the temperature rises to a level not in excess of 165° C. The reaction mixture is kept at this temperature under constant stirring for four additional hours. The mixture is then cooled to room temperature and poured on 700 grams of a mixture of ice and water. Now barium hydroxide is added to the solution until a pH value of 4–5 is attained and the precipitated barium sulfate formed is filtered off. The filtrate now contains the manganese salt of 2-carboxypyridine-5-sulphonic acid. On concentration the manganese salt crystallizes out. Next, this salt is dissolved in water and the manganese salt is converted into the corresponding sodium salt by the addition of dilute sodium hydroxide. The manganese hydroxide formed is filtered off. By the addition of barium chloride to the filtrate, the insoluble barium salt of 2-carboxypyridine-5-sulphonic acid is formed and precipitates out. From this precipitate the free acid is obtained by the procedure defined in Example 1.

*Example 3*

Thirteen and five tenths grams of sodium 3-methylpyridine-5-sulphonate are dissolved in 300 cc. of water and the solution is heated on a steam bath. To this solution 22 grams of potassium permanganate is added in small portions under constant stirring. The addition takes place over a period of two hours, and the mixture is further heated under stirring for another hour. The formed manganese dioxide is filtered off and hydrochloric acid is added to the filtrate until a pH of 6.5 is attained. Water is evaporated from the solution until only 100 cc. of the solution remains and thereupon a saturated solution of barium chloride is added until complete precipitation occurs. This precipitate mainly consists of barium oxalate resulting from rupture of the ring. The barium salt of 3-carboxypyridine-5-sulphonic acid is very soluble and remains in solution in the water. The precipitate is filtered off and the filtrate is acidified with hydrochloric acid to an extent providing a pH value of 2. Then water is evaporated from the solution until it is reduced to a very small volume, when white crystals of 3-carboxypyridine-5-sulphonic acid separate out. These crystals are recrystallized out of a mixture of alcohol and water. The product, 3-carboxy-pyridine-5-sulphonic acid, forms white needles which on heating melt and decompose at 335° C.

*Example 4*

Thirty-nine grams of sodium 4-methylpyridine-5-sulphonate are dissolved in 1040 cc. of water and the solution is heated to 55° C. To this solution 78 grams of potassium permanganate is added in small portions under constant stirring. The addition takes place over a period of one and a half hours and the mixture is further heated under stirring for four and a half hours. The formed manganese dioxide is filtered off and hydrochloric acid is added to the filtrate in a quantity providing a pH value of 6.5. Since the barium salt of 4-carboxypyridine-5-sulphonic acid is very soluble in water, it is further worked up to obtain the free acid as described in Example 3. The obtained product is recrystallized out of mixture of alcohol and water and has a melting point of 315-316° C.

The three isomeric carboxypyridine-5-sulphonic acids so produced are somewhat similar in character. They are all of white crystalline structure when recrystallized out of an alcohol-water mixture. They vary as to their melting points. The water solubility of their alkaline-earth metal salts vary, but their alkali salts are all easily soluble in water.

When the pure acids were analyzed, similar properties were found to exist. Their titration equivalent was found to be 102%, the theoretical figure being 101.5%; the N content was found to be from 6.78% to 6.85%, the theoretical amount being 6.89%.

The alkali metal salts of these acids are prepared by dissolving the acid in water and slowly adding sodium or potassium hydroxide in equivalent amounts. Thereupon water is evaporated from the solution until it is reduced to a very small volume after which the salt which crystallizes out is collected on a filter. They form white crystalline powders.

It should be understood that the present invention is not limited to the specifically mentioned times, temperatures, quantities, chemicals or procedural steps herein given for the purpose of clearly describing the invention, but that it extends to variations and substitutions which will occur to those skilled in the art upon consideration of the general tenor of the specification or the scope of the claims appended hereto.

We claim:

1. The process of producing carboxylic acid derivatives of pyridine-5-sulphonic acid of the basic general formula

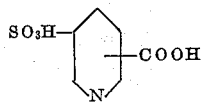

comprising oxidizing a picoline-5-sulphonic acid with an oxidizing agent selected from a group consisting of potassium permanganate and manganese dioxide and separating from the reaction mass the carboxypyridine-5-sulphonate formed.

2. The process of producing carboxylic acid derivatives of pyridine-5-sulphonic acid of the basic general formula

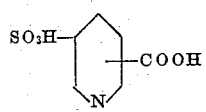

comprising oxidizing a picoline-5-sulphonic acid with potassium permanganate in alkaline solution and separating from the reaction mass the carboxypyridine-5-sulphonate formed.

3. The process of producing carboxylic acid derivatives of pyridine-5-sulphonic acid of the basic general formula

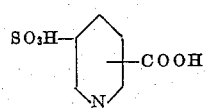

comprising oxidizing a picoline-5-sulphonic acid with manganese dioxide in a sulfuric acid solution and separating from the reaction mass the carboxypyridine-5-sulphonic acid manganese salt formed.

4. The process of producing carboxylic acid derivatives of pyridine-5-sulphonate of the basic general formula

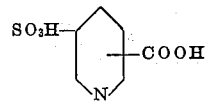

comprising oxidizing a picoline-5-sulphonic acid with an oxidizing agent selected from a group consisting of potassium permanganate and manganese dioxide and separating the carboxypyridine-5-sulphonic acid from the reaction mass by forming an alkali-earth metal salt thereof.

5. The process of producing carboxylic acid derivatives of pyridine-5-sulphonic acid of the basic general formula

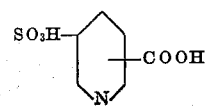

comprising oxidizing a picoline-5-sulphonic acid with potassium permanganate in alkaline solution and separating the carboxypyridine-5-sulphonic acid from the reaction mass by forming an alkali-earth metal salt thereof.

6. The process of producing carboxylic acid derivatives of pyridine-5-sulphonate of the basic general formula

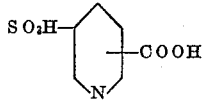

comprising oxidizing a picoline-5-sulphonic acid with manganese dioxide in a sulfuric acid solution, separating the carboxypyridine-5-sulphonic acid manganese salt from the reaction mass and forming an alkali-earth metal salt from the manganese salt.

BERNARD F. DUESEL.

REFERENCES CITED

The following references are of record in the file of this patent:

UNITED STATES PATENTS

| Number | Name | Date |
| --- | --- | --- |
| 1,880,646 | Wulfe | Oct. 4, 1942 |
| 2,372,588 | Larsen | Mar. 27, 1945 |

OTHER REFERENCES

Maier: "Das Pyridine und Seine Derivate," pp. 172 and 173, 1934.